United States Patent
Han

(10) Patent No.: US 10,775,905 B2
(45) Date of Patent: Sep. 15, 2020

(54) DISPLAY DEVICE AND CONTROL METHOD THEREFOR

(71) Applicant: LG ELECTRONICS INC., Seoul (KR)

(72) Inventor: Donghoon Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/483,197

(22) PCT Filed: Apr. 21, 2017

(86) PCT No.: PCT/KR2017/004290
§ 371 (c)(1),
(2) Date: Aug. 2, 2019

(87) PCT Pub. No.: WO2018/155763
PCT Pub. Date: Aug. 30, 2018

(65) Prior Publication Data
US 2019/0369757 A1    Dec. 5, 2019

(30) Foreign Application Priority Data

Feb. 21, 2017   (KR) .................. 10-2017-0023105

(51) Int. Cl.
*G06F 3/0354*      (2013.01)
*G06F 3/038*       (2013.01)
*G06F 3/041*       (2006.01)

(52) U.S. Cl.
CPC .......... *G06F 3/03545* (2013.01); *G06F 3/038* (2013.01); *G06F 3/0412* (2013.01)

(58) Field of Classification Search
CPC .... G06F 3/03545; G06F 3/0412; G06F 3/038; G06F 3/018; G06F 3/0383; G06F 3/0354; G06F 3/00; G06K 9/34; G06K 9/32
See application file for complete search history.

(56) References Cited

U.S. PATENT DOCUMENTS 5,565,632 A *   10/1996   Ogawa ................ G06F 3/03545
                                                    73/862.041
7,145,555 B2 * 12/2006   Taylor ................... G06F 3/0346
                                                         345/173

(Continued)

FOREIGN PATENT DOCUMENTS

| JP | 2009-181409 A | 8/2009 |
| JP | 2010-128891 A | 6/2010 |

(Continued)

*Primary Examiner* — Chad M Dicke
(74) *Attorney, Agent, or Firm* — Birch, Stewart, Kolasch & Birch, LLP

(57) ABSTRACT

The present invention relates to an electronic pen and a control method therefor. The electronic pen is configured to: receive an infrared signal from a transmitting module located at a predetermined distance or more from the electronic pen; measure the time when the infrared signal is received; calculate a distance between the transmitting module and the electronic pen on the basis of the measured time; calculate two-dimensional (2D) coordinates of the electronic pen on the basis of the calculation result; output ink to a writing target object on the basis of the calculated 2D coordinates; when the distance between a sensor module and a first end of the pen point is within the predetermined distance, adjust the magnetic pole of a first magnetic body and the magnetic pole of a second magnetic body so that the magnetic pole of the first magnetic body and the magnetic pole of the second magnetic body become identical.

11 Claims, 10 Drawing Sheets

(56) References Cited

U.S. PATENT DOCUMENTS

| | | | |
|---|---|---|---|
| 10,007,364 B2* | 6/2018 | Zimmerman | G06F 3/0383 |
| 10,121,455 B2* | 11/2018 | Inagaki | G09G 5/37 |
| 10,139,926 B2* | 11/2018 | Murauyou | G06F 3/03545 |
| 10,180,738 B2* | 1/2019 | Tzou | G06F 3/03545 |
| 10,240,990 B2* | 3/2019 | Obata | G06F 3/046 |
| 10,401,982 B2* | 9/2019 | Seo | G06F 3/046 |
| 10,402,008 B2* | 9/2019 | Katsuta | G06F 3/044 |
| 10,427,449 B2* | 10/2019 | Kaneda | B43K 27/006 |
| 10,437,359 B1* | 10/2019 | Wang | G06F 1/1632 |
| 10,442,236 B2* | 10/2019 | Koga | B43K 8/22 |
| 2015/0097815 A1* | 4/2015 | Lee | G06F 3/038 345/179 |
| 2015/0116231 A1* | 4/2015 | Kim | G06F 3/016 345/173 |
| 2016/0299606 A1* | 10/2016 | Go | G06F 3/0383 |
| 2018/0113178 A1* | 4/2018 | Lienhard | G01R 33/0047 |

FOREIGN PATENT DOCUMENTS

| | | |
|---|---|---|
| KR | 10-2013-0092325 A | 8/2013 |
| KR | 10-2013-0093408 A | 8/2013 |
| KR | 10-1375056 B1 | 3/2014 |
| KR | 10-1396376 B1 | 5/2014 |

* cited by examiner

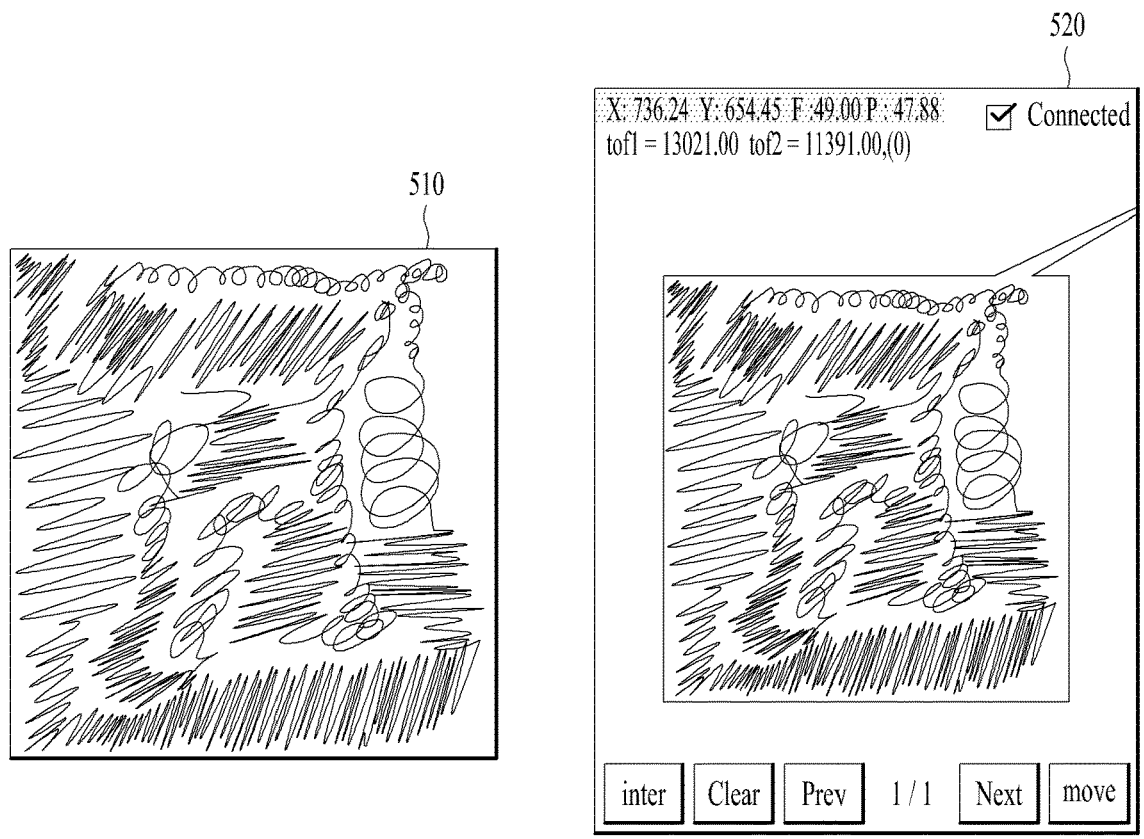

FIG. 7
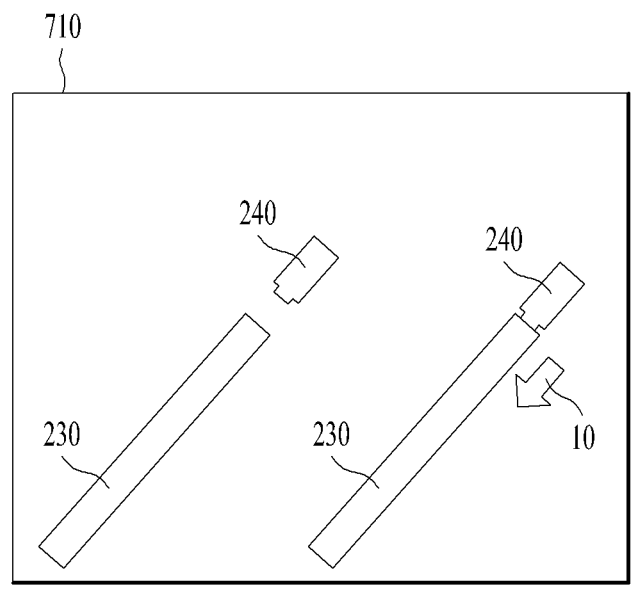
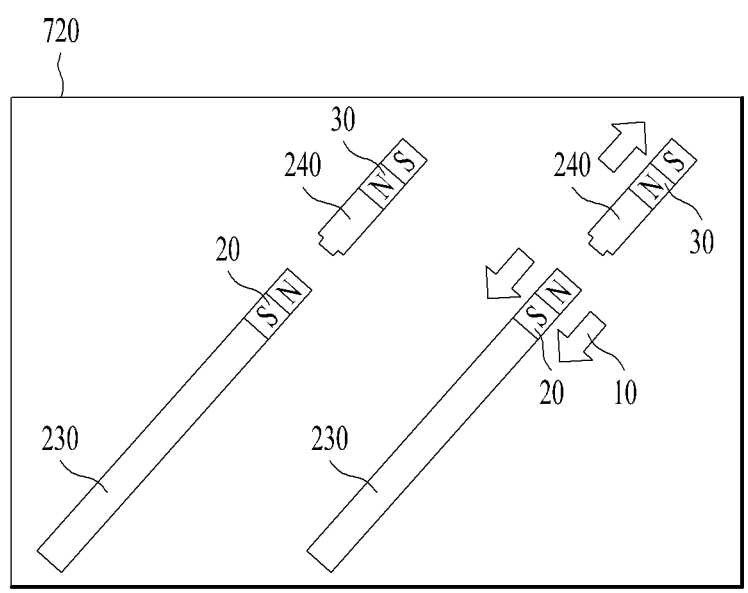

DISPLAY DEVICE AND CONTROL METHOD THEREFOR

CROSS REFERENCE TO RELATED APPLICATIONS

This application is the National Phase of PCT International Application No. PCT/KR2017/004290, filed on Apr. 21, 2017, which claims priority under 35 U.S.C. 119(a) to Patent Application No. 10-2017-0023105, filed in Republic of Korea on Feb. 21, 2017, all of which are hereby expressly incorporated by reference into the present application.

TECHNICAL FIELD

The present invention relates to an electronic pen and a control method therefor, and more particularly, to an electronic pen and a control method therefor, in which a pressure sensor and a pen lead can be spaced apart from each other quickly and exactly when a user does not take notes.

BACKGROUND ART

Recently, an electronic pen has become a big issue in daily life in accordance with the development of IT technologies, and its functions have been gradually diversified. An electronic pen according to the related art acquires a printed pattern on a writing target such as a paper or a specific surface and interprets the printed pattern. At this time, a problem occurs in that images recognized by a pen become blur images. Also, a problem occurs in that inconvenience is caused to a user because the user should carry a receiver and a pen separately.

Also, according to the related art, even in the case that a user does not take notes, a status occurs in that a pressure sensor is pressed. This is because that particles are inserted between a pen lead and the pressure sensor and thus the pen lead is not spaced apart from the pressure sensor. If the pen lead is lightweight, a problem occurs in that the pen lead and the pressure sensor are not spaced apart from each other by gravity.

For a writing, sense, a distance between the pressure sensor and the pen lead should be maintained at several tens of micrometers. A problem occurs in that it is difficult to space the pressure sensor and the pen lead apart from each other at a certain distance by using a physical tool such as spring.

DISCLOSURE

Technical Problem

An object of the present invention is to provide an electronic pen and a control method therefor, in which magnets of same pole are arranged at one end of a pen lead and one end of a pressure sensor to allow the pressure sensor and a pen lead to be spaced apart from each other using repulsion of the magnets when a user does not take notes.

Another object of the present invention is to provide an electronic pen and a control method therefor, in which a writing pressure is measured from a user and thicknesses of different fonts are displayed in accordance with a size of the writing pressure.

Other object of the present invention is to provide an electronic pen and a control method therefor, in which magnets of different polarities are arranged in front of a pen tool and at one end of a pen lead to allow a pressure sensor and the pen lead to be quickly spaced apart from each other using attraction of the magnets when a user does not take notes.

Technical Solution

An electronic pen according to one aspect of the present invention comprises a transmission module transmitting an infrared signal in a state that it is spaced apart from the electronic pen at a predetermined distance or more, a communication module receiving the infrared signal from the transmitting module and transmitting and receiving data to and from a mobile device, a sensor module sensing a writing pressure from a user, including a first magnetic body, a controller measuring the time when the received infrared signal is received, calculating a distance between the transmission module and the electronic pen based on the measured time, calculating two-dimensional coordinates of the electronic pen based on the calculated result, and outputting ink based on the calculated two-dimensional coordinates, and a pen lead outputting the ink in accordance with a control command from the controller, including a second magnetic body, wherein, if a distance between the sensor module and a first end of the pen lead is within a predetermined distance, the controller controls a magnetic pole of the first magnetic body and a magnetic pole of the second magnetic body such that the magnetic poles where the first magnetic body and the second magnetic body adjoin each other become identical to each other.

A control method for an electronic pen according to another aspect of the present invention comprises receiving an infrared signal from a transmitting module located in a place far away from the electronic pen at a predetermined distance or more, measuring the time when the received infrared signal is received, calculating a distance between the transmission module and the electronic pen based on the measured time, calculating two-dimensional coordinates of the electronic pen based on the calculated result, outputting ink to a writing target based on the calculated two-dimensional coordinates, and controlling a magnetic pole of a first magnetic body and a magnetic pole of a second magnetic body such that the magnetic poles where the first magnetic body and the second magnetic body adjoin each other become identical to each other, if a distance between the sensor module and a first end of a pen lead is within a predetermined distance.

Advantageous Effects

According to one embodiment of the present invention, magnets of the same poles may be arranged at one end of a pen lead and one end of a pressure sensor, and the pressure sensor and the pen lead may be spaced apart from each other using repulsion of the magnets when a user does not take notes, whereby user convenience may be improved.

According to another embodiment of the present invention, since a writing pressure from the user may be measured and then thicknesses of different fonts may be displayed depending on a size of the writing pressure, realistic writing sense may be provided to the user, whereby user convenience may be improved.

According to other embodiment of the present invention, magnets of different poles may be arranged in front of a pen tool and at one end of the pen lead, and the pressure sensor and the pen lead may quickly be spaced apart from each other when the user does not take notes, whereby user convenience may be improved.

BRIEF DESCRIPTION OF THE DRAWINGS

FIG. 5 is a diagram illustrating writing on a paper and display on a mobile device using an electronic pen according to one embodiment of the present invention.

FIG. 6 is a diagram illustrating that a thickness of a font of an electronic pen is varied depending on a writing pressure according to one embodiment of the present invention.

FIG. 7 is a diagram illustrating that magnets of the same pole are arranged on a pen lead and a sensor module according to one embodiment of the present invention to generate repulsion and thus space the pen lead and the sensor module apart from each other.

BEST MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Examples of a mobile terminal described in this specification may include a cellular phone, a smart phone, a laptop computer, a digital broadcast terminal, a PDA (personal digital assistants), a PMP (portable multimedia player), a navigator, a slate PC, a tablet PC, an ultrabook, and a wearable device (for example, watch type terminal (smartwatch), smart glasses, HMD (head mounted display)).

However, it will easily be apparent to those skilled in the art that the elements according to the embodiment disclosed in this specification may be applied to fixed terminals such as a digital TV, a desktop computer, and digital signage, except for the case applicable to the mobile terminal only.

Figure 1A:
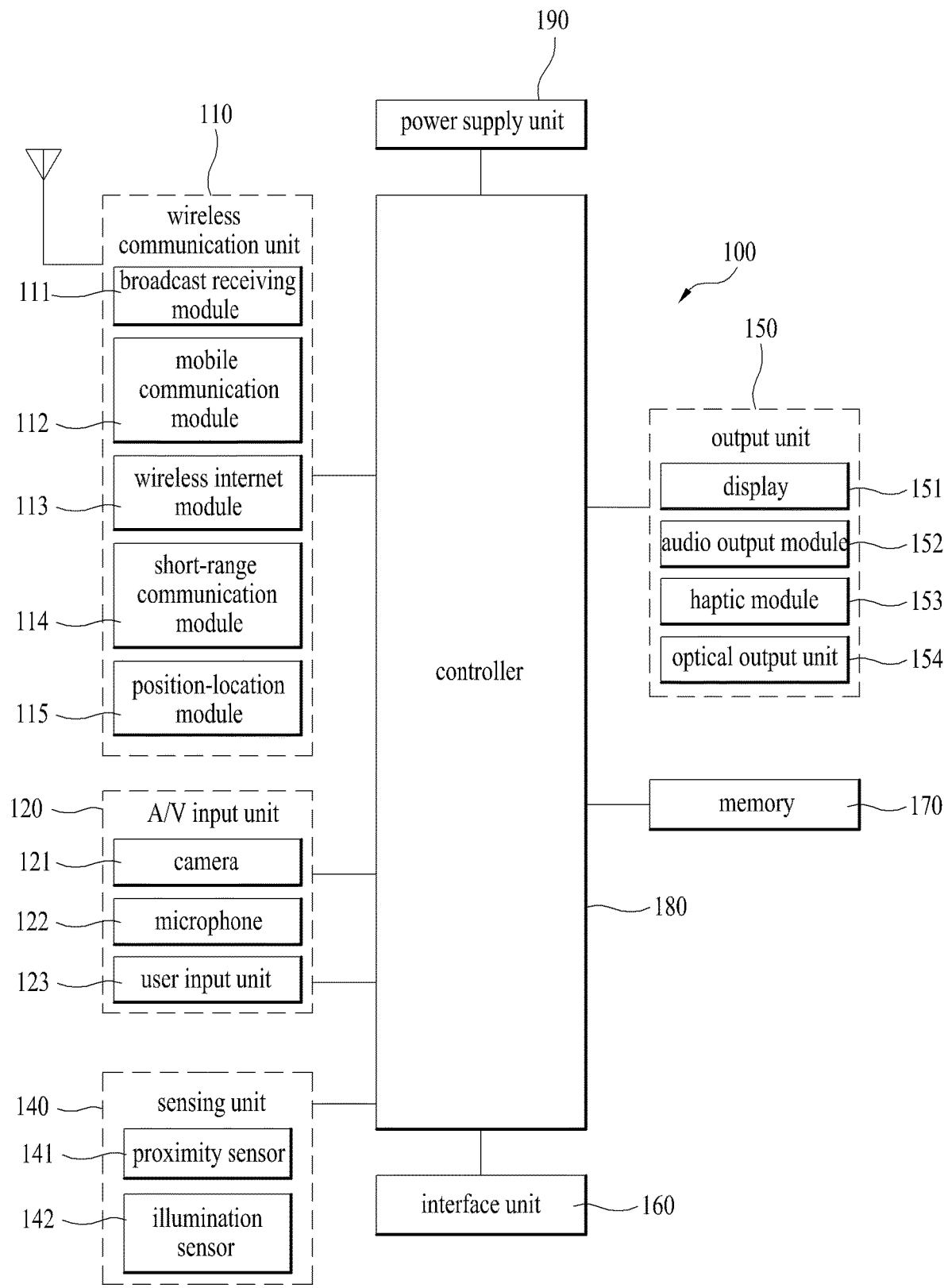
FIG. 1a is a block diagram illustrating a mobile device according to the present invention.
Figure 1B:
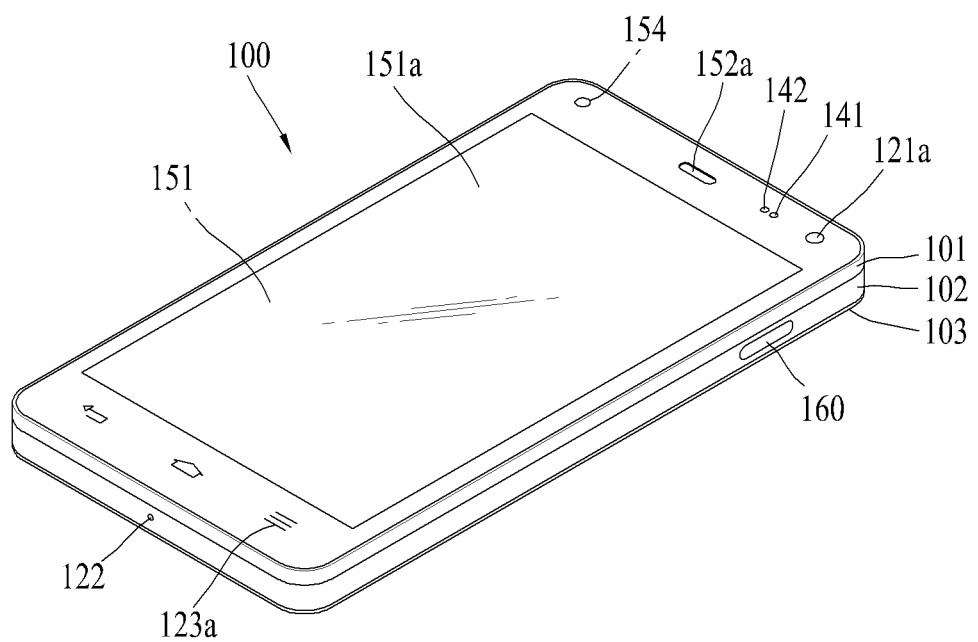
FIGS. 1b and 1c are conceptual diagrams illustrating a mobile device according to one embodiment of the present invention, which is viewed in different directions.
Figure 1C:
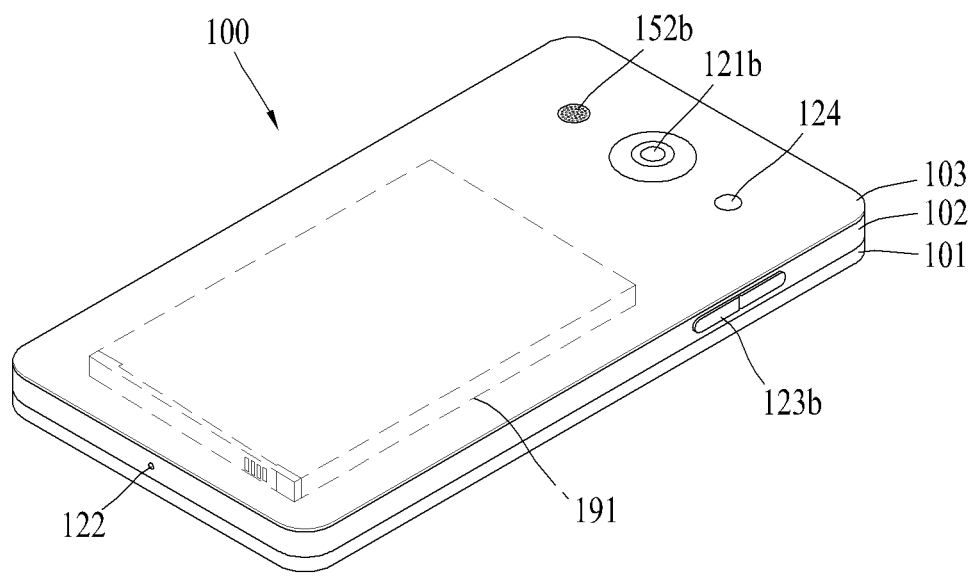

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like inputted or outputted through the above-mentioned components and/or runs application programs saved in the memory 170, thereby processing or providing a user with appropriate information and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast management server transmits the broadcast signal and/or broadcast related information or a broadcast signal or broadcast-related information, and transmits the broadcast signal and/or the broadcast-related information to the terminal. The broadcast signal may include a TV broadcast signal, a radio broadcast signal, a data broadcast signal, and a broadcast signal in which a data broadcast signal is combined with a TV broadcast signal or a radio broadcast signal.

The broadcast signal may be transmitted to a mobile station using technical standards. The broadcast receiving module 111 may be encoded according to at least one of a broadcasting system such as ISO, IEC, DVB, ATSC, and the like. Signal can be received.

The broadcast-related information may mean information related to a broadcast channel, a broadcast program, or a broadcast service provider. The broadcast-related information may also be provided through a mobile communication network. In this case, it may be received by the mobile communication module 112.

The broadcast-related information may exist in various forms, for example, an Electronic Program Guide (EPG) of Digital Multimedia Broadcasting (DMB) or an Electronic Service Guide (ESG) of Digital Video Broadcast-Handheld (DVB-H). The broadcast signal and/or broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi). Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source ma) be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

Generally, three-dimensional stereoscopic images are composed of left image (left eye image) and right image. A top-down method of arranging a left image and a right image vertically in one frame according to a method in which a left image and a right image are combined into a three-dimensional stereoscopic image. A checker board system in which pieces of a left image and a right image are arranged in a tile form, a left-to-right (right-side) Or an interlaced interlaced method in which lines are alternately arranged, and a time sequential (frame by frame) method in which right and left images are alternately displayed in time.

In addition, the 3D thumbnail image may generate a left image thumbnail and a right image thumbnail from the left image and right image of the original image frame, respectively, and may be generated as one image as they are combined. In general, a thumbnail means a reduced image or a reduced still image. The left image thumbnail and the right image thumbnail generated in this way are displayed on the screen with a difference of the left and right distance by the depth corresponding to the parallax between the left image and the right image, thereby exhibiting a stereoscopic spatial feeling.

The left and right images necessary for realizing the three-dimensional stereoscopic image can be displayed on the stereoscopic display unit by the stereoscopic processing unit. The stereoscopic processing unit receives a 3D image (an image at a reference time point and an image at an expansion point), sets a left image and a right image therefrom, or receives a 2D image and converts it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any, of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating, components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance. The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, in the present invention, it can be displayed using a display (flexible display). Hereinafter, the present invention will be described in detail with reference to the accompanying drawings.

Figure 2:
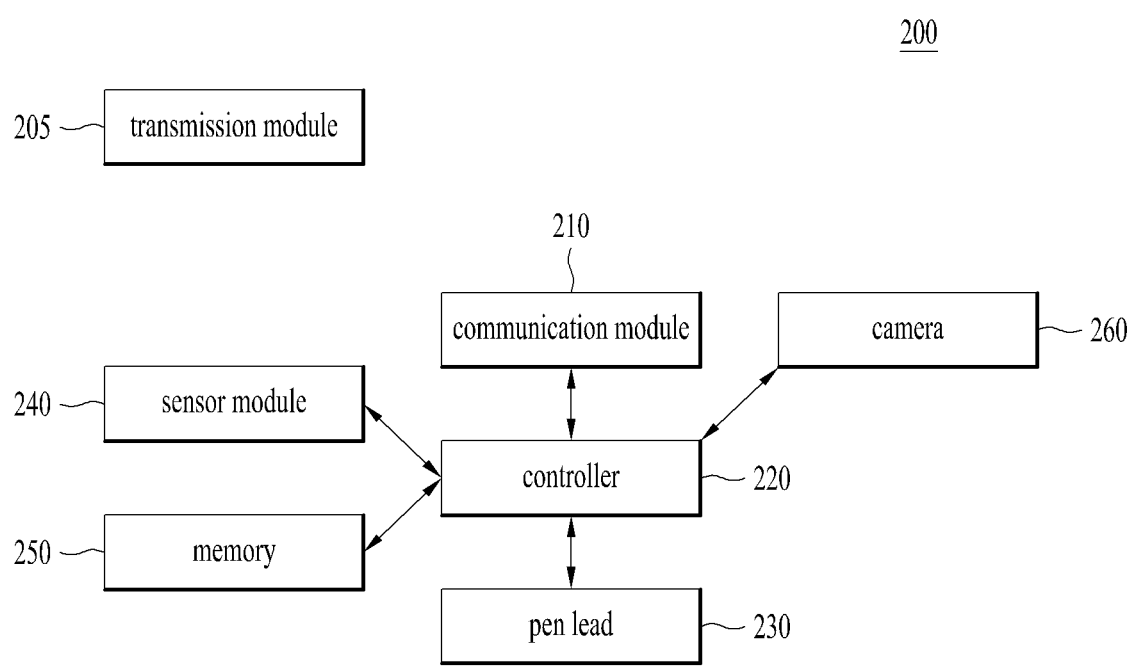
FIG. 2 is a schematic diagram illustrating an electronic pen according to one embodiment of the present invention.

FIG. 2 is a schematic diagram illustrating an electronic pen according to one embodiment of the present invention.

Referring to FIG. 2, the electronic pen 200 comprises a transmission module 205, a communication module 210, a controller 220, a pen lead 230, a sensor module 240, a memory 250, and a camera module 260.

The transmission module 205 transmits at least one of an infrared signal and an ultrasonic signal in a state that it is spaced apart from the electronic pen 200 at a predetermined distance or more.

The communication module 210 receives the infrared signal transmitted from the transmission module 205 and transmits and receives data to and from the mobile device 100.

The controller 220 measures the time when the received infrared signal is received, calculates the distance between the transmission module 205 and the electronic pen 200 based on the measured time, calculates two-dimensional coordinates of the electronic pen based on the calculated result, and outputs ink based on the calculated two-dimensional coordinates.

The controller 220 controls a first magnetic body magnetic pole and a second magnetic body magnetic pole such that the magnetic poles where the first magnetic body magnetic pole and the second magnetic body magnetic pole adjoin each other become identical to each other, if a distance between the sensor module 240 and a first end of the pen lead is within a predetermined distance.

The pen lead 230 outputs ink in accordance with a control command from the controller 220, and includes a second magnetic body.

The sensor module 240 senses a writing pressure from a user and includes a first magnetic body. The sensor module 240 includes a pressure sensor module for sensing a pressure.

The memory 250 stores image which is taken.

The camera module 260 takes an image output to a writing target. The writing target means a target for allowing a user to write using the electronic pen 200. The writing target includes a paper and a display module of the mobile device.

Figure 3:
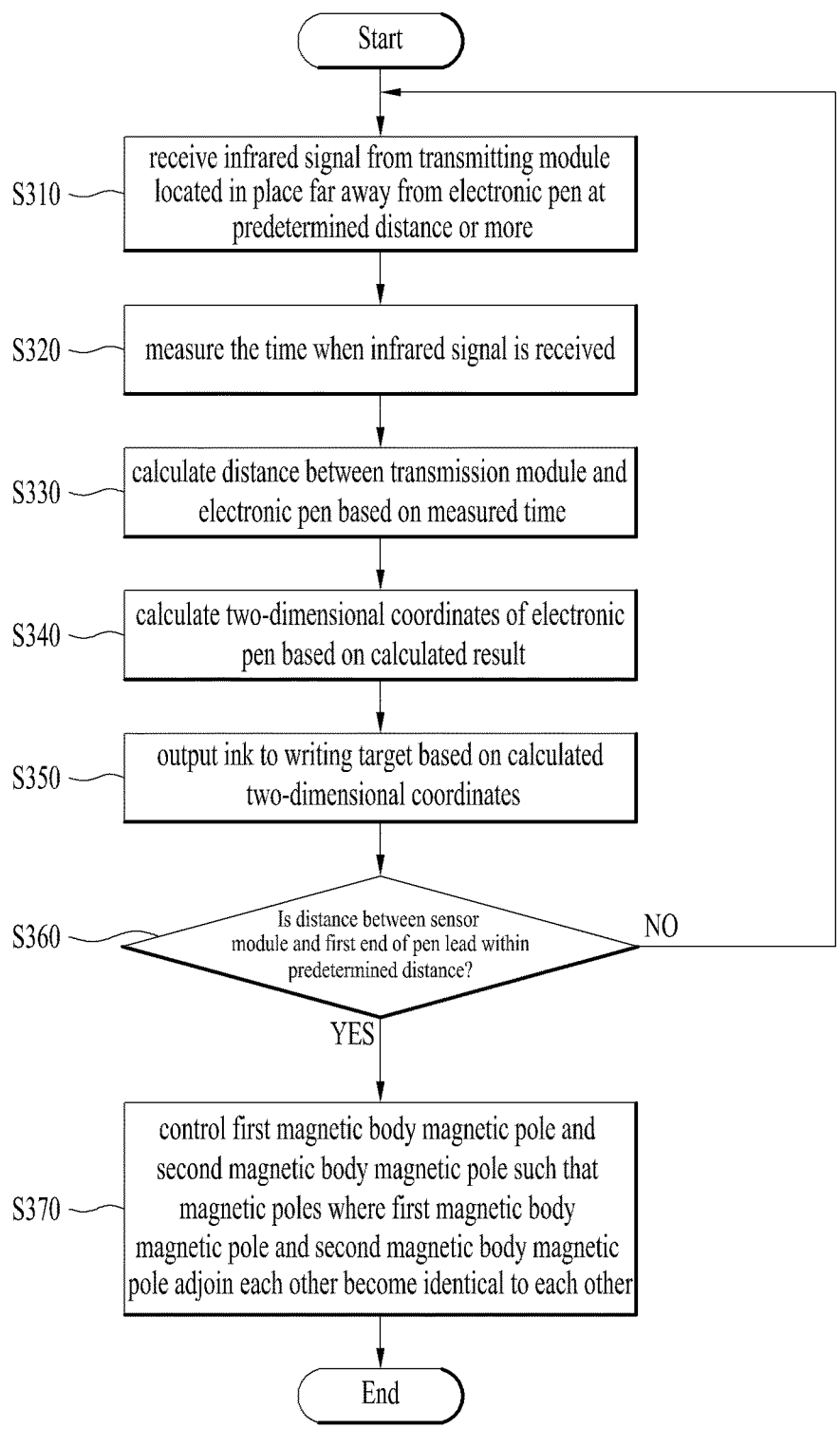
FIG. 3 is a flow chart illustrating a control method for an electronic pen according to one embodiment of the present invention.

FIG. 3 is a flow chart illustrating a control method for an electronic pen according to one embodiment of the present invention.

Referring to FIG. 3, the present invention is performed by the controller 220.

An infrared signal is received from the transmission module 205 located at a place far away from the electronic pen 200 at a predetermined distance or more (S310).

The time when the received infrared signal is received is measured (S320).

The distance between the transmission module 205 and the electronic pen 200 is calculated based on the measured time (S330).

The two-dimensional coordinates of the electronic pen 200 is calculated based on the calculated result (S340).

Ink is output to the writing target based on the calculated two-dimensional coordinates (S350).

If the distance between the sensor module and the first end of the pen lead is within a predetermined distance (S360), the first magnetic body magnetic pole and the second magnetic body magnetic pole are controlled such that the magnetic poles where the first magnetic body magnetic pole and the second magnetic body magnetic pole adjoin each other become identical to as each other (S370).

If the distance between the sensor module and the first end of the pen lead exceeds the predetermined distance (S360), the current step returns to the step S310.

Figure 4:
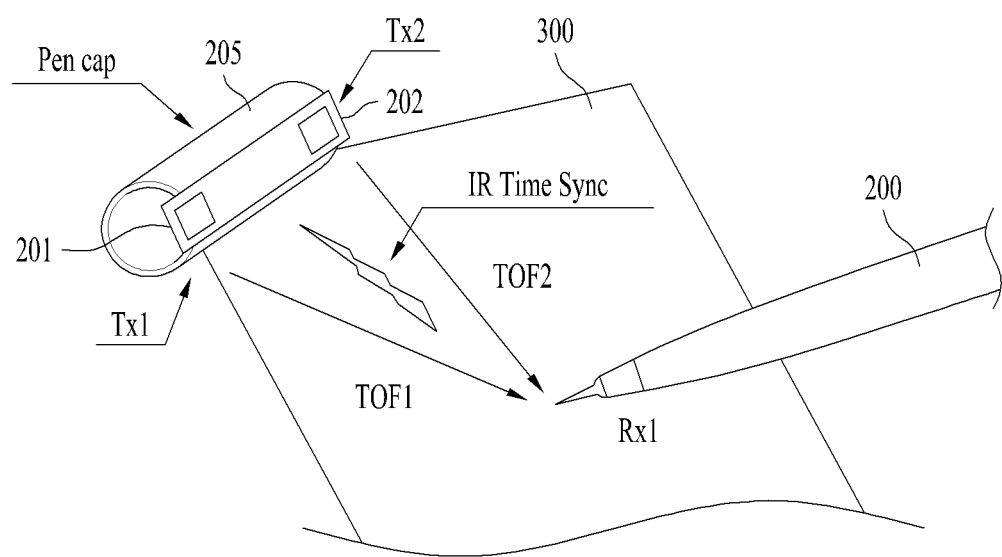
FIG. 4 is a diagram illustrating coordinate conversion by arranging a transmission module at a top portion of a paper and calculating a reception time in an electronic pen according to one embodiment of the present invention.

FIG. 4 is a diagram illustrating coordinate conversion by arranging a transmission module at a top portion of a paper and calculating a reception time in an electronic pen according to one embodiment of the present invention.

The transmission module 205 transmits at least one of the infrared signal and the ultrasonic signal. The infrared signal includes light, and the ultrasonic signal includes sound. In this case, the transmission module 205 may be a cap of the electronic pen.

The transmission module 205 includes a first transmitter and a second transmitter. The controller 220 measures the time when the received infrared signal is received, and calculates a distance between the transmission module 205 and the electronic pen 200 based on the measured time. Also, the distance between the first transmitter and the second transmitter is previously stored in the memory. Therefore, the controller 220 calculates the distance between the transmission module 205 and the electronic pen 200 by using a triangulation method.

The controller 220 calculates the two-dimensional coordinates of the electronic pen 200 based on the calculated result, and outputs ink to the writing target 300 based on the calculated two-dimensional coordinates. In this case, the writing target 300 includes a paper.

Also, the controller 220 may display the same result as the output on the display module of the mobile device connected with the electronic pen 200 by wireless communication.

According to the related art, since a user should carry a receiver connected with the electronic pen separately, a problem occurs in that the user feels inconvenience.

According to the present invention, a reception module having high hardware complexity is built in the pen, and a transmission module having low hardware complexity is built in a pen cap. Therefore, since the user does not carry the receiver separately, user convenience may be improved.

FIG. 5 is a diagram illustrating writing on a paper and display on a mobile device using an electronic pen according to one embodiment of the present invention.

Referring to embodiment 510, the controller 220 calculates the two-dimensional coordinates of the electronic pen based on the calculated result, and outputs ink to the writing target 300 based on the calculated two-dimensional coordinate. In this case, the writing target 300 includes a paper.

The controller 220 transmits two-dimensional coordinate information of the electronic pen 200 and image information taken by the camera module 260 of the electronic pen 200 to the mobile device 100 through the communication module 210.

Referring to embodiment 520, the controller 180 of the mobile device 100 may display the same result as the output on the display module 151 based on the two-dimensional coordinate information and the image information taken by the camera module 260.

FIG. 6 is a diagram illustrating that a thickness of a font of an electronic pen is varied depending on a writing pressure according to one embodiment of the present invention.

Referring to FIG. 6, the controller 220 controls thickness of the output ink differently depending on the writing pressure sensed through the sensor module 240. In detail, the controller 220 controls the thickness of the output ink in proportion to the size of the sensed writing pressure.

Referring to embodiment 610, if the size of the writing pressure is a first pressure, the controller 220 controls the thickness of the output ink to a first thickness.

Referring to embodiment 620, if the size of the writing pressure is a second pressure, the controller 220 controls the thickness of the output ink to a second thickness.

Referring to embodiment 630, if the size of the writing pressure is a third pressure, the controller 220 controls the thickness of the output ink to a third thickness.

In this case, the first pressure of the first pressure, the second pressure and the third pressure is the lowest, and the third pressure is the highest. Also, the first thickness of the first thickness, the second thickness and the third thickness is the thinnest, and the third thickness is the thickest.

FIG. 7 is a diagram illustrating that magnets of the same pole are arranged on a pen lead and a sensor module according to one embodiment of the present invention to generate repulsion and thus space the pen lead and the sensor module apart from each other.

Referring to FIG. 7, problems of the related art will be described in embodiment 710.

In the embodiment 710, a phenomenon occurs in that the sensor module 240 is pressed even in the case that the user does not take notes. The problems of the related art will be described in the embodiment 710.

In this case, the sensor module 240 includes a pressure sensor. This allows the pen lead 230 not to be from being spaced apart from the sensor module 240 by gravity 10 for various reasons such as particles existing between the pen lead 230 and the sensor module 240. Also, if the weight of the pen lead 230 is lighter than a preset weight, a problem occurs in that it is difficult to space the pen lead 230 apart from the sensor module 240.

According to the related art, a spaced distance between the pen lead 230 and the sensor module 240 should be maintained at several micrometers for a writing sense. Therefore, problems occur in that it is difficult to use a physical tool such as spring and maintain durability.

In embodiment 720, if the distance between the sensor module 240 and the first end of the pen lead 230 is within a predetermined distance, the controller 220 controls the first magnetic body magnetic pole 20 and the second magnetic body magnetic pole 30 such that magnetic poles where the first magnetic body magnetic pole 20 and the second magnetic body magnetic pole 30 adjoin each other are identical to each other.

In this case, the magnetic body includes an electromagnet and a normal magnet.

According to one embodiment, the magnetic poles where the first magnetic body magnetic pole 20 and the second magnetic body magnetic pole 30 adjoin each other may be N poles or S poles.

According to the present invention, magnets of the same pole are provided in one end of the pen lead 230 and the sensor module 240 to generate repulsion. Therefore, when a user does not take notes, the pen lead 230 and the sensor module 240 may be spaced apart from each other while maintaining a predetermined distance therebetween. Also, it is advantageous that semi-permanent durability is maintained in case of repulsion.

According to one embodiment of the present invention, the time when the pen lead 230 is detached from the sensor module 240 may be measured.

If gravity is only used in the same manner as the embodiment 710, a result distribution widely ranges from 10 ms to 1 sec.

In the same manner as the embodiment 720, if repulsion of the magnets is used, it is uniformly maintained at a level less than 1 ms. Therefore, in case of the embodiment 720, the time between the pressure sensor and the pen lead may uniformly be maintained as compared with the embodiment 710.

Figure 8:
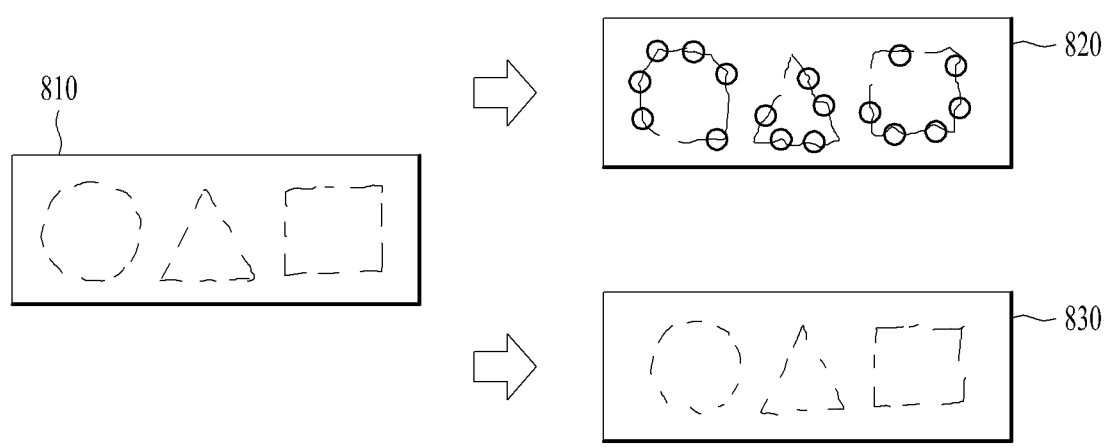
FIG. 8 is a diagram illustrating effects of the present invention according to one embodiment of the present invention.

FIG. 8 is a diagram illustrating effects of the present invention according to one embodiment of the present invention.

Referring to FIG. 8, writing on a paper using the electronic pen is shown in embodiment 810.

The effects according to the related art are shown in embodiment 820. According to the related art, discontinuous points continue to be displayed on the display module 151 of the mobile device 100 connected with the electronic pen 200 by wireless communication, and serious distortion occurs.

The effects according to the present invention are shown in embodiment 830. According to the present invention, discontinuous points are displayed on the display module 151 of the mobile device 100, which is connected with the electronic pen 200 by wireless communication, to be almost matched with actual writing, and serious distortion does not occur.

Figure 9:
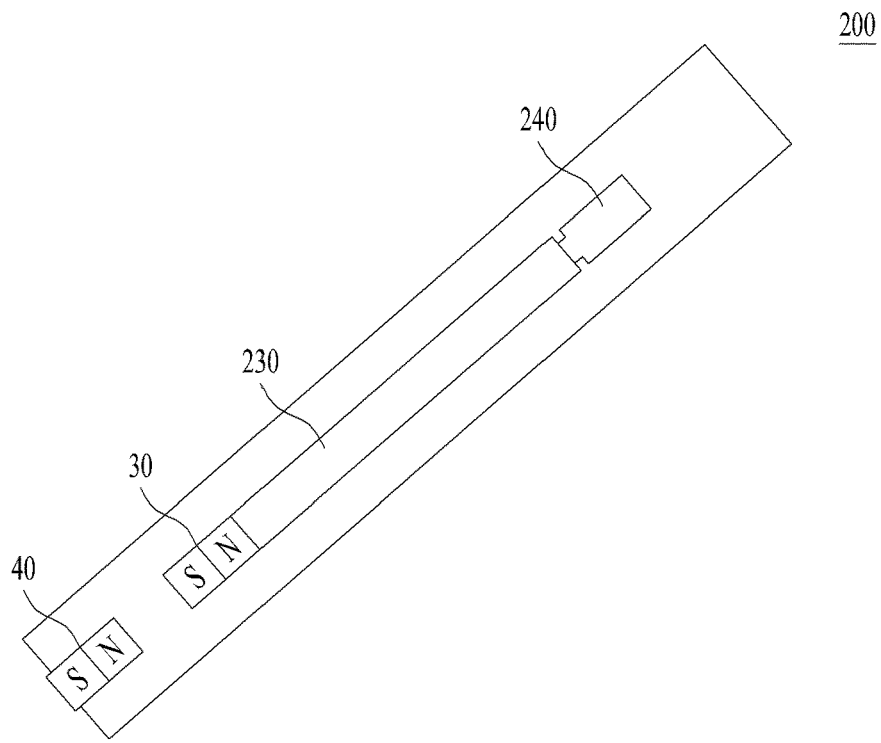
FIG. 9 is a diagram illustrating that magnets of different poles are arranged in front of an electronic pen tool and a pen lead according to one embodiment of the present invention.

FIG. 9 is a diagram illustrating that magnets of different poles are arranged in front of an electronic pen tool and a pen lead according to one embodiment of the present invention.

Referring to FIG. 9, the pen lead 230 further includes a third magnetic body 30 at a second end different from the first end of the pen lead, and a fourth magnetic body 40 is provided in a specific portion of the electronic pen 200.

The controller 220 senses a motion of the electronic pen 200 through the sensor module 240, and if the motion of the electronic pen 200 is a first reference value or less, which is previously set, the controller 220 controls the third magnetic body magnetic pole 30 and the fourth magnetic body magnetic pole 40 such that magnetic poles where the third magnetic body magnetic pole 30 and the fourth magnetic body magnetic pole 40 adjoin each other may be different from each other. In this case, the magnetic body includes an electromagnet and a normal magnet.

According to one embodiment, the third magnetic body magnetic pole 30 and the fourth magnetic body magnetic pole 40 may be N pole and S pole, respectively, or vice versa.

If the user takes notes, the electronic pen 200 moves, and the sensor module 240 senses a motion of the electronic pen 200.

According to the present invention, magnets of different poles are provided in front of a pen tool and in front of the pen lead. If the user does not take notes, the sensor module and the pen lead may quickly be spaced apart from each other due to attraction of the magnets. If the user takes notes, the magnets move downwardly by a force pressed by the user, and the user presses the sensor module with his/her hand.

Figure 10:
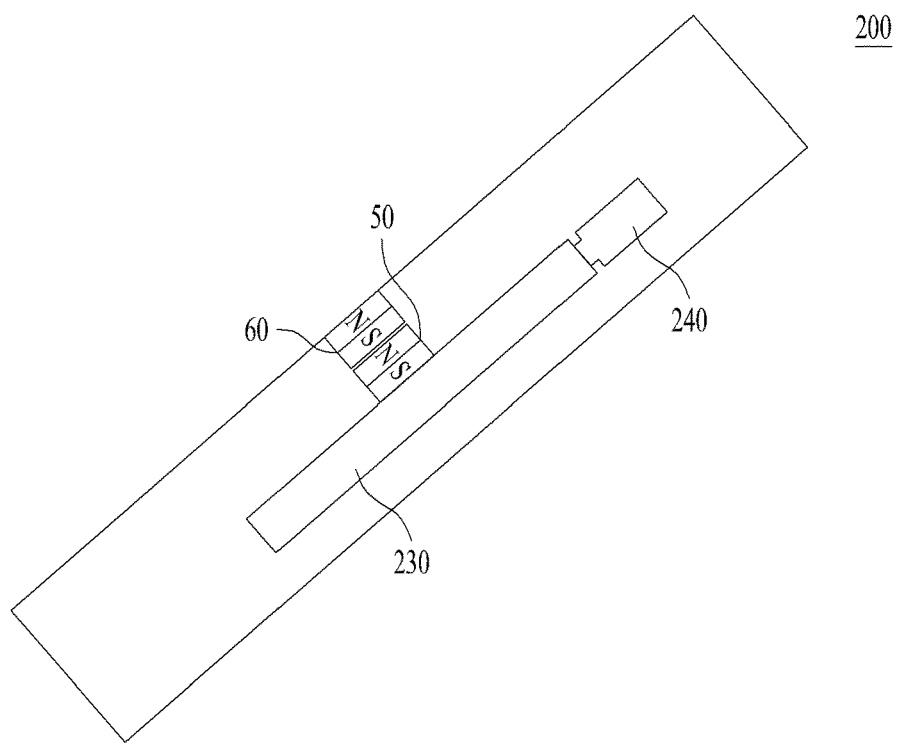
FIG. 10 is a diagram illustrating that magnets of different poles are arranged at sides of an electronic pen tool and a pen lead according to one embodiment of the present invention.

FIG. 10 is a diagram illustrating that magnets of different poles are arranged at sides of an electronic pen tool and a pen lead according to one embodiment of the present invention.

Referring to FIG. 10, a fifth magnetic body 50 is further provided at a side of the pen lead 230 of the electronic pen 200, and a sixth magnetic body 60 is provided at a specific portion of the electronic pen 200.

The controller 220 senses a motion of the electronic pen 200 through the sensor module 240.

If the motion of the electronic pen 200 is a first reference value or less, which is previously set, the controller 220 controls the fifth magnetic body magnetic pole 50 and the sixth magnetic body magnetic pole 60 such that the magnetic poles where the fifth magnetic body magnetic pole 50 and the six magnetic body magnetic pole 60 adjoin each other may be different from each other. In this case, the magnetic body includes an electromagnet and a normal magnet.

According to one embodiment, the fifth magnetic body magnetic pole 50 and the sixth magnetic body magnetic pole 60 may be N pole and S pole, respectively, or vice versa.

If the user takes notes, the electronic pen 200 moves, and the sensor module 240 senses a motion of the electronic pen 200.

According to the present invention, magnets of different poles are arranged at sides of the pen tool and the pen lead. If the user does not take notes, the sensor module and the pen lead may quickly be spaced apart from each other. If the user takes notes, the magnets move downwardly by a force pressed by the user, and the user presses the sensor module with his/her hand.

Figure 11:
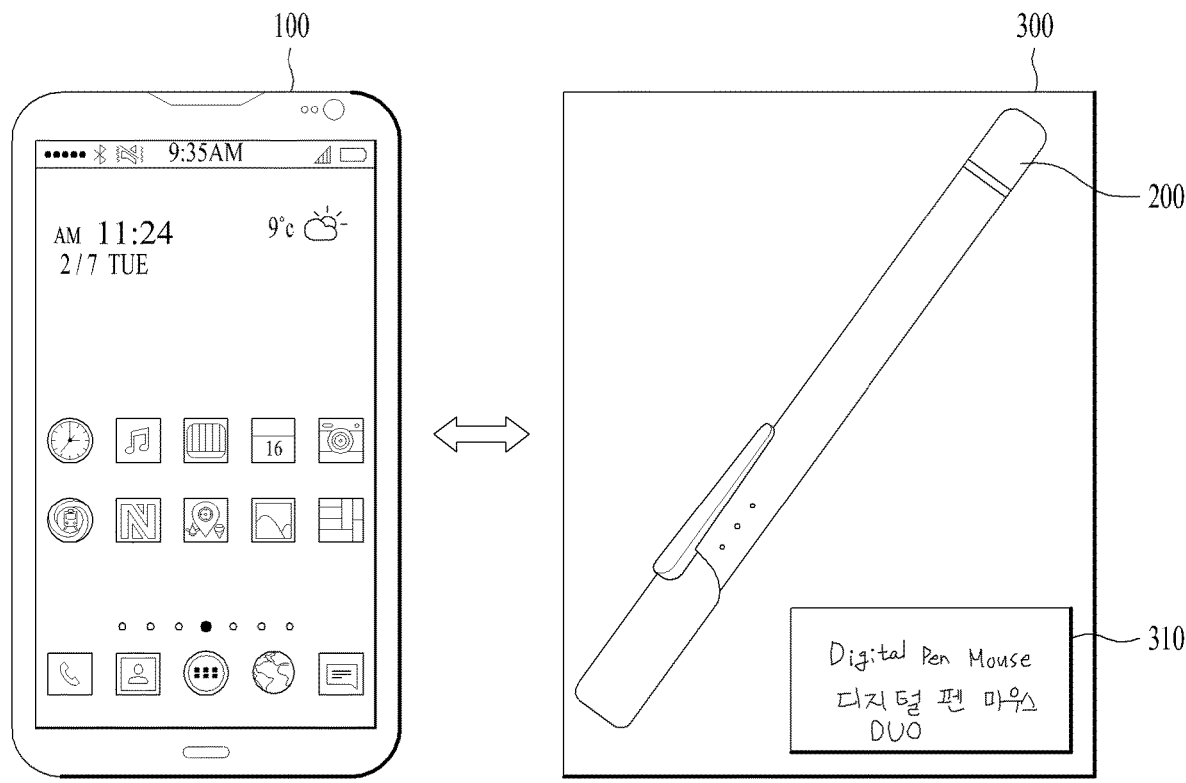
FIG. 11 is a diagram illustrating that an electronic pen and a mobile device according to one embodiment of the present invention transmit and receive data.

FIG. 11 is a diagram illustrating that an electronic pen and a mobile device according to one embodiment of the present invention transmit and receive data.

Referring to FIG. 11, the controller 220 takes an image 310 output to the writing target 300 through the camera module 260, stores the taken image 310 in the memory 250, and transmits the stored image 310 to the mobile device 100 through the communication module 210.

The writing target 300 includes a paper.

Next, a case that a user takes notes at high speed will be described.

Referring to FIG. 11, if a frame rate of the image 310 which is taken is a preset threshold value or less, the controller 220 processes the image 310. If the frame rate of the image 310 which is taken exceeds the preset threshold value, the controller 220 transmits the image 310 to the mobile device 100 through the communication module 210.

If the user takes notes at high speed, the number of frame rates is increased. The controller 220 of the electronic pen 200 processes this case. In this case, overload is applied to the controller 220, and a problem occurs in that battery consumption is increased.

According to the present invention, if the frame rate of the image 310 is the preset threshold value or less, the controller 220 of the electronic pen 200 processes the image 310. If the frame rate of the image 310 exceeds the preset threshold value, the controller 180 of the mobile device 100, which has performance more excellent than that of the controller 220 of the electronic pen 200, processes the image 310 and transmits the processed image 310 to the electronic pen 200.

Therefore, it is advantageous that the problems of overload applied to the controller 220 of the related art and battery consumption may be solved.

A case that memory capacity of the electronic pen reaches a limit will be described.

Referring to FIG. 11, if capacity of the memory 250 exceeds a limit, the controller 220 transmits the image 310, which is taken, to the mobile device 100 through the communication module 210.

The memory 250 of the electronic pen has a limit in its capacity. Therefore, if the capacity of the memory 250 reaches a limit, the memory 250 cannot store the image any more. In this case, even though the user writes on the writing target with the electronic pen 200, a problem occurs in that the display module 151 of the mobile device 100 does not display images corresponding to the time after the capacity of the memory exceeds a limit.

According to the present invention, if the capacity of the memory 250 reaches a limit, the controller 220 the image which is taken to the mobile device 100 through the communication module 210. Therefore, the display module 151 of the mobile device 100 may display images corresponding to the time after the capacity of the memory exceeds a limit.

Also, the controller 220 may transfer a warning message to the user if the capacity of the memory 250 reaches a specific rate.

For example, if the capacity of the memory 250 reaches 90%, the controller 220 may execute at least one of flickering of a flasher, generating, of a warning sound, and displaying of a warning message on the display module.

Next, a case that a size of a paper on which writing is performed with the electronic pen 200 is changed will be described.

In an initial state, the size of the paper on which writing is performed with the electronic pen 200 may be set to A4. However, if the size of the paper on which a user writes is B5, a problem as to how the size of the image should be controlled may occur. In this case, if the size of the image is controlled by the electronic pen 200, problems occur in that overload is applied to the controller 220 and battery consumption is increased.

Referring to FIG. 11, if the size of the writing target 300 is changed, for example, if the size of the paper is changed from A4, to B5, it is necessary to control the size of the image 310 which is taken. If the size control of the image 310 is required, the controller 220 transmits the taken image 310 to the mobile device 100 through the communication module 210.

According to the present invention, if the size of the paper is changed, the size control of the taken image 310 is required. The size control of the image 310 is performed by the mobile device 100 not the electronic pen 200. The controller 180 of the mobile device 100 has performance more excellent than that of the controller 220 of the electronic pen 200.

Therefore, it is advantageous that the problems of overload applied to the controller 220 of the related art and battery consumption may be solved.

Figure 12:
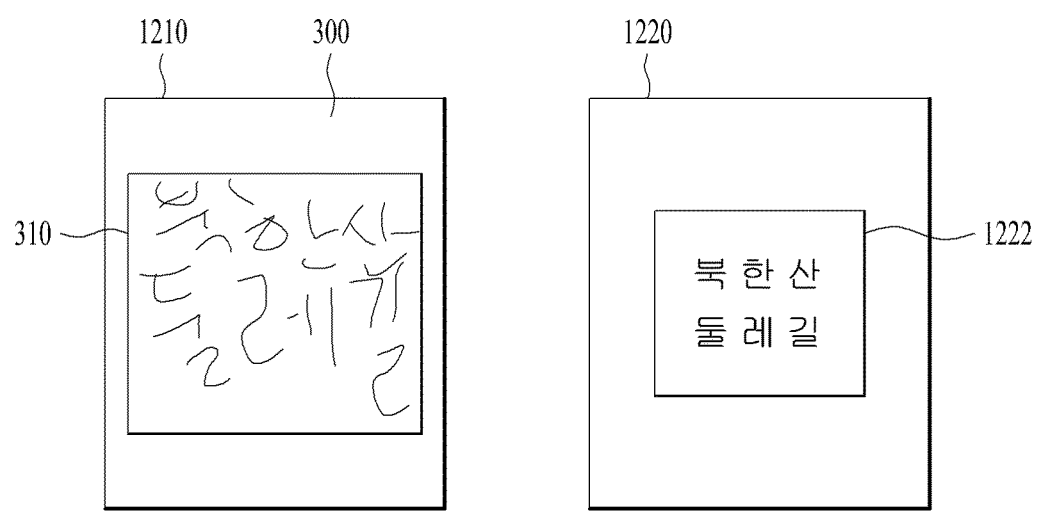
FIG. 12 is a diagram illustrating that handwriting scribbled by a user is converted to normal letters in accordance with one embodiment of the present invention.

FIG. 12 is a diagram illustrating that handwriting scribbled by a user is converted to normal letters in accordance with one embodiment of the present invention.

Referring to FIG. 12, a case that a user scribbles on the writing target 300 with the electronic pen is shown in embodiment 1210.

The controller 220 recognizes the image 310 which is taken and makes a pattern for the recognized image 310. The controller 220 compares the patterned image 310 with text information previously stored in the memory 250.

Referring to embodiment 1220, the controller 220 converts the patterned image 310 to a text 1222 corresponding to the text information, and transmits the converted text 1222 to the mobile device 100 through the communication module 210.

Therefore, the converted text 1222 is displayed on the display module 151 of the mobile device 100 in the same manner as the embodiment 1220.

According to the present invention, since writing scribbled by the user may be converted to normal letters, the user may view the normal letters through the mobile device, whereby user convenience may be improved.

According to one embodiment of the present invention, the magnets of the same poles may be arranged at one end of the pen lead and one end of the pressure sensor, and the pressure sensor and the pen lead may be spaced apart from each other using repulsion of the magnets when the user does not take notes, whereby user convenience may be improved.

According to another embodiment of the present invention, since the writing pressure from the user may be measured and then the thicknesses of different fonts may be displayed depending on the size of the writing pressure, realistic writing sense may be provided to the user, whereby user convenience may be improved.

According to still another embodiment of the present invention, the magnets of different poles may be arranged in front of the pen tool and at one end of the pen lead, and the pressure sensor and the pen lead may quickly be spaced apart from each other using attraction of the magnets when the user does not take notes, whereby user convenience may be improved.

It will be apparent to those skilled in the art that the present invention can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

MODE FOR CARRYING OUT THE INVENTION

Various embodiments have been described in the best mode for carrying out the present invention.

INDUSTRIAL APPLICABILITY

The present invention is used in the electronic pen related field.

It will be apparent to those skilled in the art that various modifications and variations can be made in the present invention without departing from the spirit or scope of the invention. Thus, the present invention is intended to include modifications and changes of the present invention provided in the appended claims and the equivalent scope thereof.

The invention claimed is:

1. An electronic pen comprising:
a transmission module transmitting an infrared signal in a state that it is spaced apart from the electronic pen at a predetermined distance or more;
a communication module receiving the infrared signal from the transmitting module and transmitting and receiving data to and from a mobile device;
a sensor module sensing a writing pressure from a user, including a first magnetic body;
a controller measuring the time when the received infrared signal is received, calculating a distance between the transmission module and the electronic pen based on the measured time, calculating two-dimensional coordinates of the electronic pen based on the calculated result, and outputting ink based on the calculated two-dimensional coordinates; and
a pen lead outputting the ink in accordance with a control command from the controller, including a second magnetic body,
wherein the controller is configured to: when a distance between the sensor module and a first end of the pen lead is within a predetermined distance, control a magnetic pole of the first magnetic body and a magnetic pole of the second magnetic body to become identical to each other to repel the pen lead away from the sensor module.

2. The electronic pen of claim 1, wherein the controller controls a thickness of the output ink in accordance with the writing pressure sensed through the sensor module.

3. The electronic pen of claim 2, wherein the controller controls the thickness of the output ink in proportion to a size of the sensed writing pressure.

4. The electronic pen of claim 1, wherein the pen lead further includes a third magnetic body at a second end different from the first end of the pen lead, a fourth magnetic body is provided in a specific portion of the electronic pen, and the controller senses a motion of the electronic pen through the sensor module, and controls a magnetic pole of the third magnetic body and a magnetic pole of the fourth magnetic body such that the magnetic poles where the third magnetic body and the fourth magnetic body adjoin each other become different from each other, if the motion of the electronic pen is a first reference value or less, which is previously set.

5. The electronic pen of claim 1, wherein the pen lead further includes a fifth magnetic body at a side end thereof, a sixth magnetic body is provided in a specific portion of the electronic pen, and the controller senses a motion of the electronic pen through the sensor module, and controls a magnetic pole of the fifth magnetic body and a magnetic pole of the sixth magnetic body such that the magnetic poles where the fifth magnetic body and the sixth magnetic body adjoin each other become different from each other, if the motion of the electronic pen is a first reference value or less, which is previously set.

6. The electronic pen of claim 1, further comprising:
a camera module taking an image output to the writing target; and
a memory storing the taken image;
wherein the controller takes the image output to the writing target through the camera module, stores the taken image in the memory, transmits the stored image to the mobile device through the communication module.

7. The electronic pen of claim 6, wherein the controller processes the taken image if a frame rate of the image is a preset threshold value or less, and transmits the image to the mobile device through the communication module if the frame rate of the image exceeds the preset threshold value.

8. The electronic pen of claim 6, wherein the controller transmits the taken image to the mobile device through the communication module if capacity of the memory exceeds a limit.

9. The electronic pen of claim 6, wherein the controller transmits the taken image to the mobile device through the communication module if size control of the image is required.

10. The electronic pen of claim 6, wherein the controller recognizes the taken image, makes a pattern for the recognized image, compares the patterned image with text information previously stored in the memory, converts the patterned image to a text corresponding to the text information, and transmits the converted text to the mobile device through the communication module.

11. A control method for an electronic pen comprising:
receiving an infrared signal from a transmitting module located in a place far away from the electronic pen at a predetermined distance or more;
measuring the time when the received infrared signal is received;
calculating a distance between the transmission module and the electronic pen based on the measured time;
calculating two-dimensional coordinates of the electronic pen based on the calculated result;
outputting ink to a writing target based on the calculated two-dimensional coordinates; and
when a distance between a sensor module in the electronic pen and a first end of the pen lead is within a predetermined distance, controlling, by a controller in the electronic pen, a magnetic pole of a first magnetic body and a magnetic pole of a second magnetic body to become identical to each other to repel a pen lead away from the sensor module.

* * * * *